United States Patent
Kim

(10) Patent No.: US 10,271,338 B2
(45) Date of Patent: Apr. 23, 2019

(54) METHOD AND APPARATUS FOR TRANSMITTING AND RECEIVING DATA

(71) Applicant: Electronics and Telecommunications Research Institute, Daejeon (KR)

(72) Inventor: Ji Hyung Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 391 days.

(21) Appl. No.: 15/013,223

(22) Filed: Feb. 2, 2016

(65) Prior Publication Data
US 2016/0270092 A1    Sep. 15, 2016

(30) Foreign Application Priority Data
Mar. 11, 2015    (KR) .................. 10-2015-0034071

(51) Int. Cl.
H04W 72/08    (2009.01)
H04L 5/00    (2006.01)
H04L 25/03    (2006.01)
H04W 72/00    (2009.01)
H04B 1/7107    (2011.01)

(52) U.S. Cl.
CPC .......... *H04W 72/085* (2013.01); *H04L 5/006* (2013.01); *H04L 25/0328* (2013.01); *H04B 1/71072* (2013.01); *H04W 72/005* (2013.01)

(58) Field of Classification Search
CPC ............. H04W 72/005; H04W 72/085; H04W 52/24; H04W 52/241; H04W 52/243; H04W 52/244; H04W 52/245; H04W 52/248; H04W 52/262; H04L 5/00; H04L 5/006; H04B 1/71072
See application file for complete search history.

(56) References Cited

U.S. PATENT DOCUMENTS

2010/0098030 A1*    4/2010    Wang ................... H04B 7/0426
                                               370/335
2010/0284355 A1    11/2010    Jung et al.
(Continued)

OTHER PUBLICATIONS

Yuya Saito et al., "Non-Orthogonal Multiple Access (NOMA) for Future Radio Access," 2013 IEEE 77th Vehicular Technology Conference (VTC Spring), Jun. 2-5, 2013, pp. 1-5, Dresden.

*Primary Examiner* — Habte Mered
(74) *Attorney, Agent, or Firm* — William Park & Associates Ltd.

(57) ABSTRACT

There are provided a method for transmitting data including collecting signal-to-noise ratio (SNR) information of a plurality of neighbor nodes, recognizing that at least one reception node to receive data in an nth frame exists, among the plurality of neighbor nodes, setting a modulation and coding scheme (MCS) on the basis of the SNR of the at least one reception node, and transmitting data to the at least one reception node by using the same radio resource on the basis of the MCS, and an apparatus and method for receiving data including receiving data from at least one transmission node, determining a threshold value of each transmission node on the basis of information regarding a modulation and coding scheme (MCS) of the at least one transmission node, and canceling interference with respect to the data on the basis of a signal-to-noise ratio (SNR) of the at least one transmission node and the threshold value.

12 Claims, 3 Drawing Sheets

(56) References Cited

U.S. PATENT DOCUMENTS

| | | | | |
|---|---|---|---|---|
| 2010/0330899 | A1* | 12/2010 | Hong | H04H 20/08 |
| | | | | 455/3.01 |
| 2011/0275399 | A1* | 11/2011 | Englund | H04W 72/1231 |
| | | | | 455/513 |
| 2012/0207097 | A1* | 8/2012 | Lee | H04B 7/0452 |
| | | | | 370/328 |
| 2015/0092681 | A1* | 4/2015 | Fernando | H04W 24/10 |
| | | | | 370/329 |
| 2015/0282185 | A1* | 10/2015 | Nikopour | H04L 1/0002 |
| | | | | 370/329 |
| 2015/0358064 | A1* | 12/2015 | Benjebbour | H04B 7/0452 |
| | | | | 370/329 |
| 2016/0037460 | A1* | 2/2016 | Benjebbour | H04L 1/0003 |
| | | | | 370/329 |
| 2016/0142193 | A1* | 5/2016 | Benjebbour | H04J 11/0043 |
| | | | | 370/329 |
| 2016/0174230 | A1* | 6/2016 | Benjebbour | H04W 52/346 |
| | | | | 370/329 |
| 2016/0219529 | A1* | 7/2016 | Benjebbour | H04W 52/14 |
| 2016/0262167 | A1* | 9/2016 | Lan | H04L 5/0057 |
| 2016/0330695 | A1* | 11/2016 | Benjebbour | H04W 52/262 |

* cited by examiner

METHOD AND APPARATUS FOR TRANSMITTING AND RECEIVING DATA

CROSS-REFERENCE TO RELATED APPLICATION

This application claims priority to and the benefit of Korean Patent Application No. 10-2015-0034071 filed in the Korean Intellectual Property Office on Mar. 11, 2015, the entire contents of which are incorporated herein by reference.

BACKGROUND OF THE INVENTION (a) Field of the Invention

The present invention relates to a method and apparatus for transmitting and receiving data in a wireless communication system.

(b) Description of the Related Art

Recently, research into cancellation of interference from a reception signal when data is transmitted and received using the same radio resource, in line with research into an increase in a transfer rate of wireless data, has been conducted. In a case in which a certain node transmits data using the same radio resource, the node may increase a probability of detecting data in a reception node by appropriately adjusting transmission power.

SUMMARY OF THE INVENTION

The present invention has been made in an effort to provide a method and apparatus having advantages of effectively canceling interference from data received through the same radio resource and adjusting transmission power of data.

An exemplary embodiment of the present invention provides a method for transmitting data. The method for transmitting data may include: collecting signal-to-noise ratio (SNR) information of a plurality of neighbor nodes; recognizing that at least one reception node to receive data in an nth frame exists, among the plurality of neighbor nodes; setting a modulation and coding scheme (MCS) on the basis of the SNR of the at least one reception node; and transmitting data to the at least one reception node by using the same radio resource on the basis of the MCS. The setting may include: when the data is transmitted in a broadcast or multicast manner, setting the MCS on the basis of an average SNR value or a minimum SNR value of the at least one reception node; and when the data is transmitted in a unicast manner, setting the MCS on the basis of a smaller SNR value among the average SNR value of the at least one reception node and the SNR value of the node to receive the data in the unicast manner.

The method may further include: receiving a power adjustment request from the at least one reception node which has received the data; resetting the MCS; and transmitting data on the basis of the reset MCS.

The receiving may include receiving information regarding an SNR range in which data detection is available and a power adjustment request range, wherein the resetting of the MCS may include: reselecting an SNR from an intersection of the SNR range and the power adjustment request range; and resetting the MCS on the basis of the reselected SNR.

The SNR range may be determined on the basis of a first SNR as a minimum SNR in which data detection is available, a second SNR as a lower limit value of a maximum SNR in which a successive interference cancellation (SIC) technique is applicable and data detection is available, and a third SNR as an upper limit value of the maximum SNR in which the SIC technique is applicable and data detection is available, and may include a first range from the first SNR to the second SNR and a second range from the first SNR to the third SNR.

The reselecting may include, when there is no intersection of the first range and the power adjustment request range, reselecting the SNR from an intersection of the second range and the power adjustment request range.

Another embodiment of the present invention provides a method for receiving data. The method for receiving data may include: receiving data from at least one transmission node; determining a threshold value of each transmission node on the basis of information regarding a modulation and coding scheme (MCS) of the at least one transmission node; and canceling interference with respect to the data on the basis of a signal-to-noise ratio (SNR) of the at least one transmission node and the threshold value.

The removing may include: comparing an SNR of a first transmission node among the at least one transmission node with a magnitude of a first threshold value determined on the basis of an MCS of a first transmission node; and applying an interference rejection combining (IRC) technique or applying the IRC technique and a successive interference cancellation (SIC) technique together to first data received from the first transmission node on the basis of the comparison result.

The method may further include, when it is not possible to detect second data received from a second transmission node among the at least one transmission node, requesting adjustment of transmission power from the second transmission node.

The requesting may include transmitting an SNR range in which detection of the second data is available and a power adjustment request range to the second transmission node.

The SNR range may be determined on the basis of a first SNR as a minimum SNR in which data detection is available, a second SNR as a lower limit value of a maximum SNR in which a successive interference cancellation (SIC) technique is applicable and data detection is available, and a third SNR as an upper limit value of the maximum SNR in which the SIC technique is applicable and data detection is available, and may include a first range from the first SNR to the second SNR and a second range from the first SNR to the third SNR.

Yet another embodiment of the present invention provides an apparatus for receiving data. The apparatus for receiving data may include: at least one processor; a memory; and a wireless communication unit, wherein the at least one processor may perform: executing at least one program stored in the memory to receive data from at least one transmission node; determining a threshold value with respect to each transmission node on the basis of information regarding a modulation and coding scheme (MCS) of the at least one transmission node; and canceling interference with respect to the data on the basis of a signal-to-noise ratio (SNR) of the at least one transmission node and the threshold value.

When the at least one processor performs the removing, the at least one processor may perform: comparing an SNR of a first transmission node among the at least one transmission node with a magnitude of a first threshold value determined on the basis of MCS of the first transmission node; and applying an interference rejection combining (IRC) technique or applying the IRC technique and a successive interference cancellation (SIC) technique together to first data received from the first transmission node on the basis of the comparison result.

When it is not possible to detect second data received from a second transmission node among the at least one transmission node, the at least one processor may further perform requesting adjustment of transmission power from the second transmission node.

When performing the requesting, the at least one processor may perform transmitting an SNR range in which detection of second data is available and a power adjustment request range to the second transmission node.

The SNR range is determined on the basis of a first SNR as a minimum SNR in which data detection is available, a second SNR as a lower limit value of a maximum SNR in which a successive interference cancellation (SIC) technique is applicable and data detection is available, and a third SNR as an upper limit value of the maximum SNR in which the SIC technique is applicable and data detection is available, and includes a first range from the first SNR to the second SNR and a second range from the first SNR to the third SNR.

DETAILED DESCRIPTION OF THE EMBODIMENTS

Figure 1:
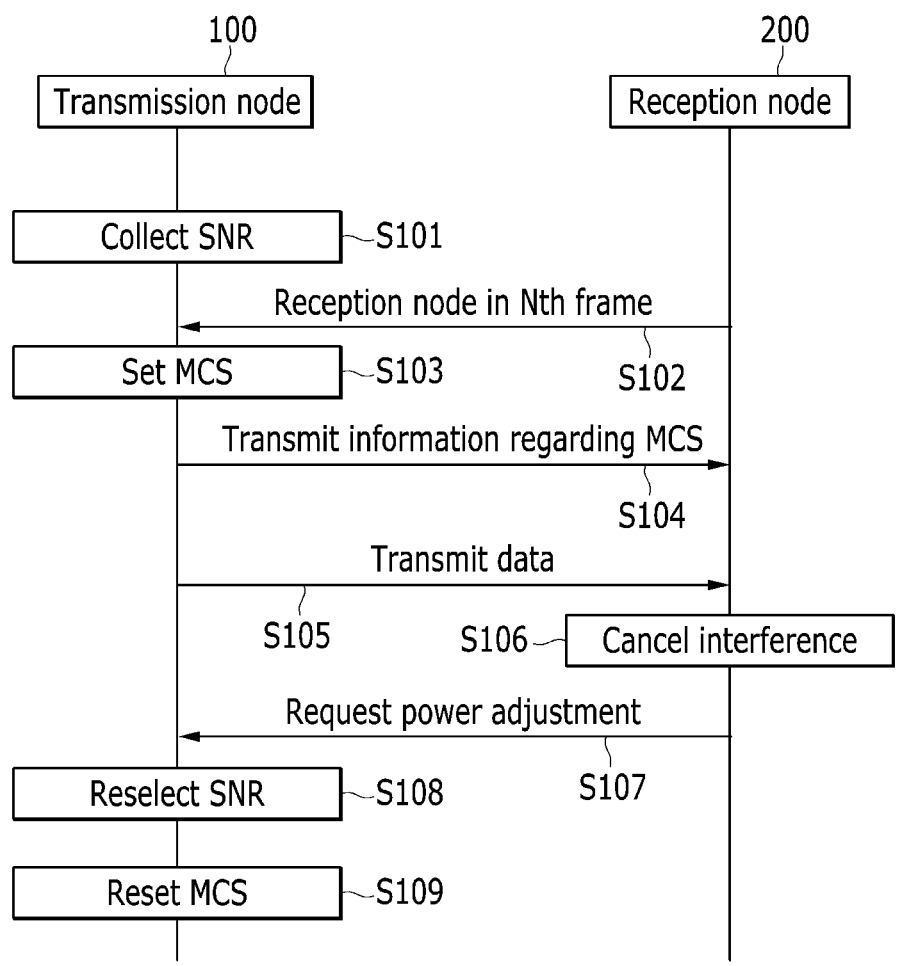
FIG. 1 is a flowchart illustrating a method for transmitting and receiving data according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, a mobile station (MS) may refer to a terminal, a mobile terminal (MT), an advanced mobile station (AMS), a high reliability mobile station (HR-MS), a subscriber station (SS), a portable subscriber station (PSS), an access terminal (AT), user equipment (UE), or the like, and may include an entirety or a portion of functions of a terminal, an MT, an AMS, an HR-MS, an SS, a PSS, an AT, UE, or the like.

Also, a base station (BS) may refer to an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as a base station, a relay node (RN) serving as a base station, an advanced relay station (ARS) serving as a base station, a high reliability relay station (HR-RS) serving as a base station, small base stations (BSs) (e.g., a femto base station (BS), a home node B (HNB), a home eNodeB (HeNB), a pico BS, a metro BS, a micro BS, etc.), and the like, and may include the entirety or a portion of functions of an ABS, a node B, an eNodeB, an AP, an RAS, a BTS, an MMR-BS, an RS, an RN, an ARS, an HR-RS, a small BS, and the like.

Figure 2:
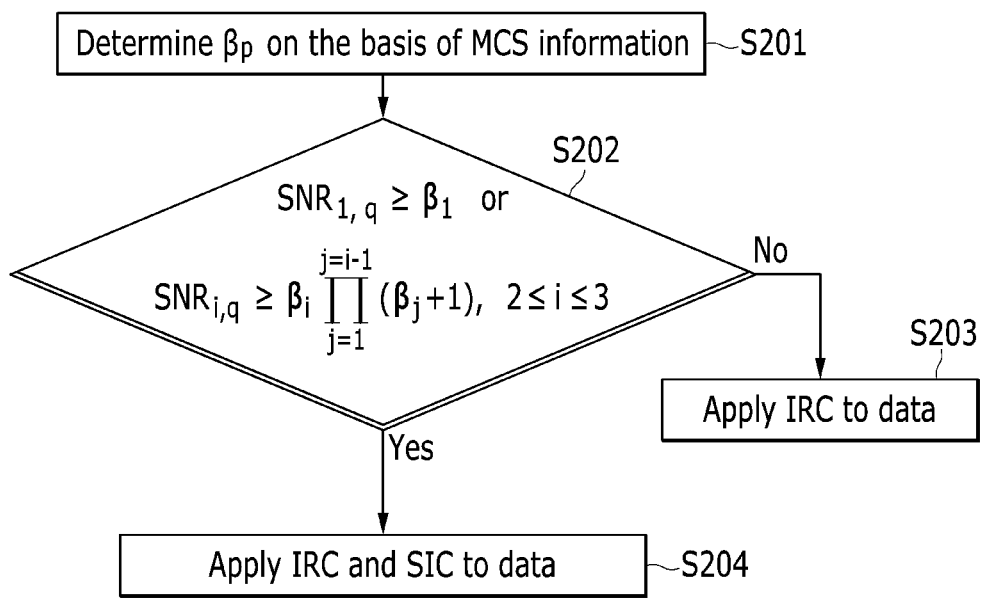
FIG. 2 is a flowchart illustrating a method for canceling interference according to an exemplary embodiment of the present invention.

FIG. 1 is a flowchart illustrating a method for transmitting and receiving data according to an exemplary embodiment of the present invention, and FIG. 2 is a flowchart illustrating a method for canceling interference according to an exemplary embodiment of the present invention.

When a certain transmission node p and a certain reception node q exist in a network according to an exemplary embodiment of the present invention, a condition for the reception node 200 to receive data transmitted through the same resource from the transmission node 100 may be determined as expressed by Equation 1 below.

$$SNR_{p,q} \geq \beta_p \quad \text{(Equation 1)}$$

Here, $SNR_{p,q}$ denotes a signal-to-noise ratio (SNR) of the signal received by the reception node 200, and $\beta_p$ denotes a threshold value of a successful data detection. That is, when the SNR of the signal received by the reception node 200 is greater than $\beta_p$, the reception node 200 may successfully detect the data transmitted from the transmission node 100.

FIG. 1 is a view illustrating a method for canceling interference of data transmitted and received in an nth frame and resetting transmission power through feedback.

First, each node periodically or aperiodically broadcasts information (for example, a reference signal received power (RSRP), SNR, etc.) regarding received power of a signal. For example, the node q may receive reference signals RSs from transmission nodes 1, 2, and 3, and subsequently broadcast SNRs ($SNR_{1,q}$, $SNR_{2,q}$, and $SNR_{3,q}$) of the reference signal periodically or aperiodically. Thereafter, SNR information of each node may be collected by the transmission node 100 (S101).

Thereafter, a node to receive data through an nth frame informs therearound that the node will operate as a reception node in the nth frame (S102). The transmission node 100 to receive data through the nth frame sets a modulation and coding scheme (MCS) level on the basis of SNR information of other node (S103). Here, the MCS level set by the transmission node 100 may vary according to transmission schemes of data to be transmitted. For example, when the transmission node 100 transmits data in a broadcast or multicast manner, the transmission node 100 may set an MCS level on the basis of an average SNR value or a minimum SNR value of at least one reception node. Alternatively, when the transmission node 100 transmits data in a unicast manner, the transmission node 100 may set an MCS level on the basis of a smaller SNR value among an average SNR value of at least one reception node and an SNR value of a reception node to receive the data in a unicast manner. Thereafter, the transmission node 100 provides information regarding the set MCS to the reception node 200 (S104), and transmits data using the same radio resource on the basis of the set MCS (S105).

Thereafter, the reception node 200 receives data from the transmission node 100 in the nth frame, and cancels interference from the received data (S106).

FIG. 2 is a flowchart illustrating a method for canceling interference according to an exemplary embodiment of the present invention.

Referring to FIG. 2, the reception node 200 arranges transmission nodes 100 according to SNRs of the transmission nodes 100. In an exemplary embodiment of the present invention, a case in which an SNR of a third transmission node is greatest, an SNR of a second transmission node comes next, and an SNR of a first transmission node is smallest ($SNR_{3,q} \geq SNR_{2,q} \geq SNR_{1,q}$), will be described as an example.

The reception node 200 determines $\beta_p$ with respect to each transmission node 100 on the basis of an MCS of each transmission node 100 (S201). Subsequently, the reception node 200 compares the SNR of each transmission node 100 with $\beta_p$ in order to determine an interference cancellation technique to be applied to the received data (S202). Here, the reception node 200 follows Equation 2 below for the transmission node having the smallest SNR, and follows Equation 3 below for the other remaining transmission nodes.

$$SNR_{1,q} \geq \beta_1 \qquad \text{(Equation 2)}$$

$$SNR_{i,q} \geq \beta_i \prod_{j=1}^{j=i-1} (\beta_j + 1), 2 \leq i \leq 3 \qquad \text{(Equation 3)}$$

After the reception node 200 compares the SNR of each transmission node 100 with $\beta_p$, the reception node 200 applies an interference rejection combining (IRC) technique to data received from the transmission node 100 which does not satisfy both Equation 2 and Equation 3 (S203). Meanwhile, the reception node 200 applies a successive interference cancellation (SIC) technique and the IRC technique to data received from a transmission node 100 satisfying Equation 2 or Equation 3 (S204).

In an exemplary embodiment of the present invention, when a plurality of transmission nodes simultaneously transmit signals to the reception node 200, the reception node 200 simultaneously receives the plurality of signals transmitted from the plurality of transmission nodes. In an exemplary embodiment of the present invention, it is assumed that the SNR of the third transmission node is greatest, the SNR of the second transmission node is the second greatest, and the SNR of the first transmission node is smallest, and in this case, generally, the reception node 200 first detects a signal (a third signal) from the third transmission node. Thus, the reception node 200 removes the third signal detected from a reception signal thereafter, and among reception signals from which the third signal was removed, the reception node 200 detects a second signal on the basis of SNRs. Finally, the reception node 200 removes the detected third and second signals from the reception signals, thereby obtaining a first signal transmitted from the first transmission node. Here, if the SNR of the third transmission node does not satisfy Equation 3, there may be an error in detecting the third signal so an error may also occur in detecting the remaining second and first signals. In this case, in order to accurately detect the second signal and the first signal, the reception node determines whether the SNRs of the second transmission node and the first transmission node satisfy Equation 2 or Equation 3. When the SNR of the third transmission node does not satisfy Equation 3, if the SNR of the second transmission node satisfies Equation 3 and the SNR of the first transmission node satisfies Equation 2, the reception node may detect the second signal from the reception signals, remove the detected second signal from the reception signals, and detect the first signal again from the reception signals from which the second signal was removed.

Referring back to FIG. 1, the reception node 200 requests the transmission node 100, which satisfies neither Equation 2 nor Equation 3, to adjust transmission power of data (S107). Here, in an exemplary embodiment of the present invention, the reception node 200 transmits an SNR range in which data detection is available and a power adjustment request range to the transmission node 100. In an exemplary embodiment of the present invention, the SNR range informed by the reception node 200 to the transmission node 100 may be determined in at least three SNRs. Equation 4 expresses an SNR range according to an exemplary embodiment of the present invention.

$$\text{SNR range: } (SNR_{i,q}^{mn}, SNR_{i,q}^{mx\_l}, SNR_{i,q}^{mx\_u}) \qquad \text{(Equation 4)}$$

In Equation 4, $SNR_{i,q}^{mn}$ denotes a minimum value of an SNR in which data detection is available, $SNR_{i,q}^{mx\_l}$ is a lower limit value of a maximum SNR in which SIC can be applied with a neighbor node (that is, the transmission node which has transmitted data) and data detection is available, and $SNR_{i,q}^{mx\_u}$ is an upper limit value of the maximum SNR in which SIC can be applied with another node and data detection is available. In an exemplary embodiment of the present invention, an SNR range transmitted from the reception node 200 to the transmission node 100 may be calculated according to Equation 5 to Equation 10. In Equation 5 to Equation 10, $\mu$ is the greatest SNR (for example, $SNR_{3,q}$), and N is the number of transmission nodes.

$$SNR_{1,q}^{mn} \geq \beta_1 \qquad \text{(Equation 5)}$$

Equation 5 expresses a minimum value of the SNR available for data detection with respect to a transmission node with the smallest SNR (the first transmission node in an exemplary embodiment of the present invention).

$$SNR_{i,q}^{mn} \geq \beta_i \prod_{j=1}^{j=i-1} (\beta_j + 1), 2 \leq i \leq N \qquad \text{(Equation 6)}$$

Equation 6 expresses a minimum value of the SNR available for data detection with respect to transmission nodes whose SNRs are not smallest) (the second transmission node and the third transmission node in an exemplary embodiment of the present invention).

$$\frac{\mu}{\beta_N \prod_{j=2}^{j=N-1} (\beta_j + 1)} - 1 \geq SNR_{1,q}^{mx\_l} \qquad \text{(Equation 7)}$$

Equation 7 is a lower limit value of the maximum value of the SNR available for SIC application with respect to a transmission node having the smallest SNR and available for data detection.

$$\frac{\mu \beta_i}{\beta_N \prod_{j=i}^{j=N-1} (\beta_j + 1)} \geq SNR_{i,q}^{mx\_l}, 2 \leq i \leq N-1 \qquad \text{(Equation 8)}$$

Equation 8 expresses a lower limit value of the maximum value of the SNR available for SIC application with respect to the transmission nodes whose SNR are not smallest and available for data detection.

$$\frac{\mu}{\beta_N} - \prod_{j=1}^{j=N-2} (\beta_j + 1) \geq SNR_{N-1,q}^{mx\_u} \qquad \text{(Equation 9)}$$

Equation 9 expresses an upper limit value of a maximum value of the SNR available for SIC application with respect to the transmission node having the smallest SNR and available for data detection.

$$\frac{\mu}{\beta_N \sum_{j=i+1}^{j=N-1}(\beta_j+1)} - \prod_{j=1}^{j=i-1}(\beta_j+1) \geq SNR_{i,q}^{mx\_u}, 2 \leq i \leq N-2 \quad \text{(Equation 10)}$$

Equation 10 expresses an upper limit value of a maximum value of the SNR available for SIC application and available for data detection with respect to transmission nodes whose SNR are not smallest.

Thereafter, the transmission node 100 may reselect an SNR on the basis of the received SNR range and power adjustment request range (S108), and reset an MCS level on the basis of the reselected SNR (S109). For example, the transmission node 100 reselects one of SNRs included an intersection of a first SNR range ($SNR_{i,q}^{mn}$–$SNR_{i,q}^{mx\_l}$) among SNR ranges and the power adjustment request range, as an SNR of the reception node 200.

When the transmission node 100 transmits data in a broadcast manner or a multicast manner, the transmission node 100 may reselect one of an average value of $SNR_{i,q}^{mx\_l}$ and a minimum $SNR_{i,q}^{mx\_l}$, as an SNR. When the transmission node 100 transmits data in a unicast manner, the transmission node 100 may reselect an SNR close to a smaller value among the average value of $SNR_{i,q}^{mx\_l}$ and $SNR_{i,q}^{mx\_l}$ of a node to receive the data in a unicast manner. Here, when an intersection of the first SNR range and the power adjustment request range does not exist, the transmission node 100 may compare a second SNR range (($SNR_{i,q}^{mn}$–$SNR_{i,q}^{mx\_u}$) with the power adjustment request range.

Thereafter, the transmission node 100 resets an MCS with respect to the reselected SNR, adjusts power, and retransmits data. Meanwhile, for the reception node 200 not included in the intersection, the transmission node 100 transmits data on the basis of the existing MCS, without resetting the MCS.

According to an exemplary embodiment of the present invention described above, a transmission node may determine an MCS on the basis of an SNR of a reception node and transmit data on the basis of the determined MCS, and a reception node may determine an interference cancellation technique with respect to received data by comparing a threshold value determined on the basis of the MCS with an SNR of the transmission node. Thus, the transmission node may transmit data using the same radio resource to a plurality of reception nodes according to the MCS determined on the basis of SNRs of the reception nodes, and the reception nodes may effectively cancel interference of received data, increasing overall capacity of the network.

Figure 3:
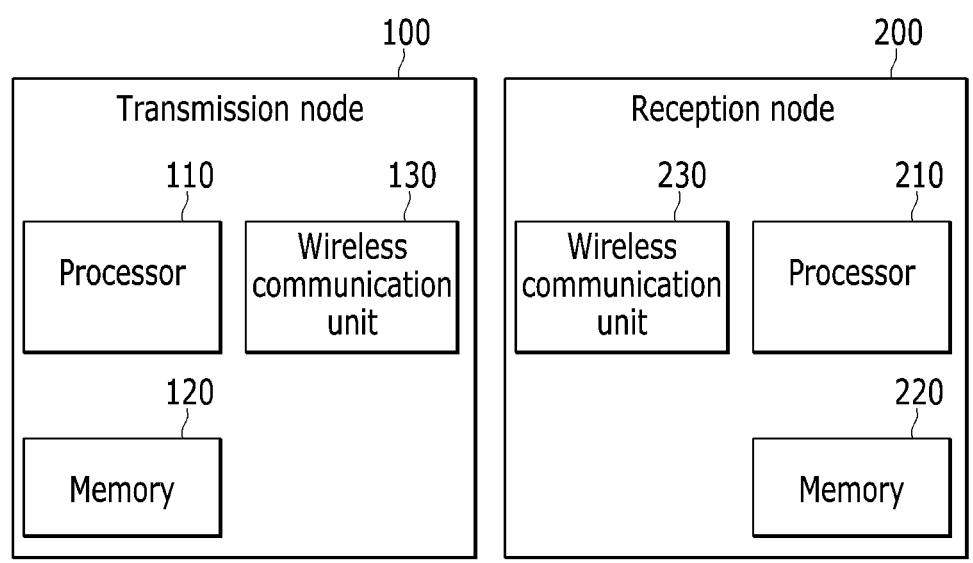
FIG. 3 is a block diagram illustrating a wireless communication system according to an exemplary embodiment of the present invention.

FIG. 3 is a block diagram illustrating a wireless communication system according to an exemplary embodiment of the present invention.

Referring to FIG. 3, a wireless communication system according to an exemplary embodiment of the present invention includes a transmission node 100 and a reception node 200.

The transmission node 100 includes a processor 110, a memory 120, and a radio frequency (RF) unit 130. The memory 120 may be connected to the processor 110 and store various types of information for driving the processor 110. The wireless communication unit 130 may be connected to the processor 110 to transmit and receive a wireless signal. The processor 110 may realize a function, a process, or a method proposed in an exemplary embodiment of the present invention. Here, in the wireless communication system according to an exemplary embodiment of the present invention, a wireless Internet protocol layer may be realized by the processor 110. An operation of the transmission node 100 according to an exemplary embodiment of the present invention may be realized by the processor 110.

The reception node 200 includes a processor 210, a memory 220, and a wireless communication unit 230. The memory 220 may be connected to the processor 210 and store various types of information for driving the processor 210. The wireless communication unit 230 may be connected to the processor 210 and transmit and receive a wireless signal. The processor 210 may realize a function, a process, or a method proposed in an exemplary embodiment of the present invention. Here, in the wireless communication system according to an exemplary embodiment of the present invention, a wireless Internet protocol layer may be realized by the processor 210. An operation of the reception node 200 according to an exemplary embodiment of the present invention may be realized by the processor 210.

In an exemplary embodiment of the present invention, the memory may be positioned within or outside of the processor, and may be connected to the processor through various known units. The memory may be various types of volatile or non-volatile storage media, and may include a read-only memory (ROM) or a random access memory (RAM), for example.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting data using a same radio resource that is used to both transmit and receive data, the method comprising:
   collecting signal-to-noise ratio (SNR) information of a plurality of neighbor nodes;
   recognizing that at least one reception node to receive data in an nth frame exists, among the plurality of neighbor nodes;
   setting a modulation and coding scheme (MCS) on the basis of the SNR of the at least one reception node;
   transmitting data to the at least one reception node by using the same radio resource on the basis of the MCS;
   receiving a power adjustment request from the at least one reception node which has received the data and receiving information regarding an SNR range in which data detection is available and a power adjustment request range;
   resetting the MCS; and
   transmitting data on the basis of the reset MCS,
   wherein the SNR range is determined on the basis of a first SNR as a minimum SNR in which data detection is available, a second SNR as a lower limit value of a maximum SNR in which a successive interference cancellation (SIC) technique is applicable and data detection is available, and a third SNR as an upper limit value of the maximum SNR in which the SIC technique is applicable and data detection is available, and includes a first range from the first SNR to the second SNR and a second range from the first SNR to the third SNR.

2. The method of claim 1, wherein the setting of MCS comprises:
when the data is transmitted in a broadcast or multicast manner, setting the MCS on the basis of an average SNR value or a minimum SNR value of the at least one reception node; and
when the data is transmitted in a unicast manner, setting the MCS on the basis of a smaller SNR value among the average SNR value of the at least one reception node and the SNR value of the node to receive the data in the unicast manner.

3. The method of claim 1,
wherein the resetting comprises:
reselecting an SNR from an intersection of the SNR range and the power adjustment request range; and
resetting the MCS on the basis of the reselected SNR.

4. The method of claim 1, wherein the reselecting comprises, when there is no intersection of the first range and the power adjustment request range, reselecting the SNR from an intersection of the second range and the power adjustment request range.

5. A method for receiving data, the method comprising:
receiving data from at least one transmission node; and
removing interference with respect to the data on the basis of a signal-to-noise ratio (SNR) of the at least one transmission node and a threshold value predetermined, for each of the transmission node, based on information regarding a modulation and coding scheme (MCS) received from the at least one transmission node,
wherein the removing comprises:
comparing an SNR of a first transmission node among the at least one transmission node with a magnitude of a first threshold value determined on the basis of an MCS of a first transmission node; and
applying an interference rejection combining (IRC) technique to first data received from the first transmission node or applying the IRC technique and a successive interference cancellation (SIC) technique to the first data received from the first transmission node sequentially on the basis of the comparison result.

6. The method of claim 5, further comprising, when it is not possible to detect second data received from a second transmission node among the at least one transmission node, requesting adjustment of transmission power from the second transmission node.

7. The method of claim 6, wherein the requesting comprises transmitting an SNR range in which detection of the second data is available and a power adjustment request range to the second transmission node.

8. The method of claim 7, wherein the SNR range is determined on the basis of a first SNR as a minimum SNR in which data detection is available, a second SNR as a lower limit value of a maximum SNR in which a successive interference cancellation (SIC) technique is applicable and data detection is available, and a third SNR as an upper limit value of the maximum SNR in which the SIC technique is applicable and data detection is available, and includes a first range from the first SNR to the second SNR and a second range from the first SNR to the third SNR.

9. An apparatus for receiving data, the apparatus comprising:
at least one processor;
a memory; and
a wireless communication unit configured to transmit and receive wireless signals,
wherein the at least one processor executes at least one program stored in the memory to perform:
receiving, by using the wireless communication unit, data from at least one transmission node; and
removing interference with respect to the data on the basis of a signal-to-noise ratio (SNR) of the at least one transmission node and a threshold value predetermined, for each of the transmission node, based on information regarding a modulation and coding scheme (MCS) received from the at least one transmission node,
wherein, when the at least one processor performs the removing, the at least one processor performs:
comparing an SNR of a first transmission node among the at least one transmission node with a magnitude of a first threshold value determined on the basis of MCS of the first transmission node; and
applying an interference rejection combining (IRC) technique to first data received from the first transmission node or applying the IRC technique and a successive interference cancellation (SIC) technique together to the first data received from the first transmission node sequentially on the basis of the comparison result.

10. The apparatus of claim 9, wherein, when it is not possible to detect second data received from a second transmission node among the at least one transmission node, the at least one processor further performs requesting adjustment of transmission power from the second transmission node.

11. The apparatus of claim 10, wherein, when performing the requesting, the at least one processor performs transmitting an SNR range in which detection of second data is available and a power adjustment request range to the second transmission node.

12. The apparatus of claim 11, wherein the SNR range is determined on the basis of a first SNR as a minimum SNR in which data detection is available, a second SNR as a lower limit value of a maximum SNR in which a successive interference cancellation (SIC) technique is applicable and data detection is available, and a third SNR as an upper limit value of the maximum SNR in which the SIC technique is applicable and data detection is available, and includes a first range from the first SNR to the second SNR and a second range from the first SNR to the third SNR.

* * * * *